United States Patent [19]

Kojima et al.

[11] Patent Number: 5,682,438
[45] Date of Patent: Oct. 28, 1997

[54] METHOD AND APPARATUS FOR DETERMINING A MOTION VECTOR

[75] Inventors: Kazuhito Kojima; Hideyuki Mizusawa, both of Sagamihara, Japan

[73] Assignee: Nippon Steel Corporation, Tokyo, Japan

[21] Appl. No.: 492,995

[22] Filed: Jun. 21, 1995

[30] Foreign Application Priority Data

Jun. 21, 1994 [JP] Japan ................................. 6-162740
May 19, 1995 [JP] Japan ................................. 7-145333

[51] Int. Cl.$^6$ ............................. G06K 9/36; H04N 7/12
[52] U.S. Cl. ......................... 382/107; 382/236; 348/413; 348/416
[58] Field of Search ...................... 382/232, 236, 382/238, 251, 252, 253, 240, 246, 282, 239, 243; 348/699, 700, 404, 416, 407, 413, 406, 408, 409, 405, 431, 451, 452, 674; 342/25

[56] References Cited

U.S. PATENT DOCUMENTS

| | | | |
|---|---|---|---|
| 5,057,919 | 10/1991 | De Haan et al. | 358/136 |
| 5,179,383 | 1/1993 | Raney et al. | 342/25 |
| 5,355,168 | 10/1994 | Sugiyama | 348/416 |
| 5,436,674 | 7/1995 | Hirabayashi et al. | 348/699 |
| 5,446,806 | 8/1995 | Ran et al. | 382/240 |

FOREIGN PATENT DOCUMENTS 6-334980 A   2/1994   Japan ................................. H04N 7/13

*Primary Examiner*—Jose L. Couso
*Assistant Examiner*—Matthew C Bella
*Attorney, Agent, or Firm*—Pollock, Vande Sande & Priddy

[57] ABSTRACT

In order to detect a motion vector representing a movement of an objective area in a first image of a plurality of successive images, first, a plurality of comparison areas are determined in a second image before or after the first image. Subsequently, a difference total sum between the objective area and each of the comparison areas is obtained with respect to the plurality of comparison areas, thereby obtaining a distribution of the difference total sums. The resultant distribution of the difference total sums is approximately expressed in the form of a predetermined polynomial. By using this polynomial, the position is obtained where the difference total sums become minimum. By treating the resultant position of the area as the position before or after the movement of the objective area, the motion vector representing the movement of the objective area is detected.

8 Claims, 17 Drawing Sheets

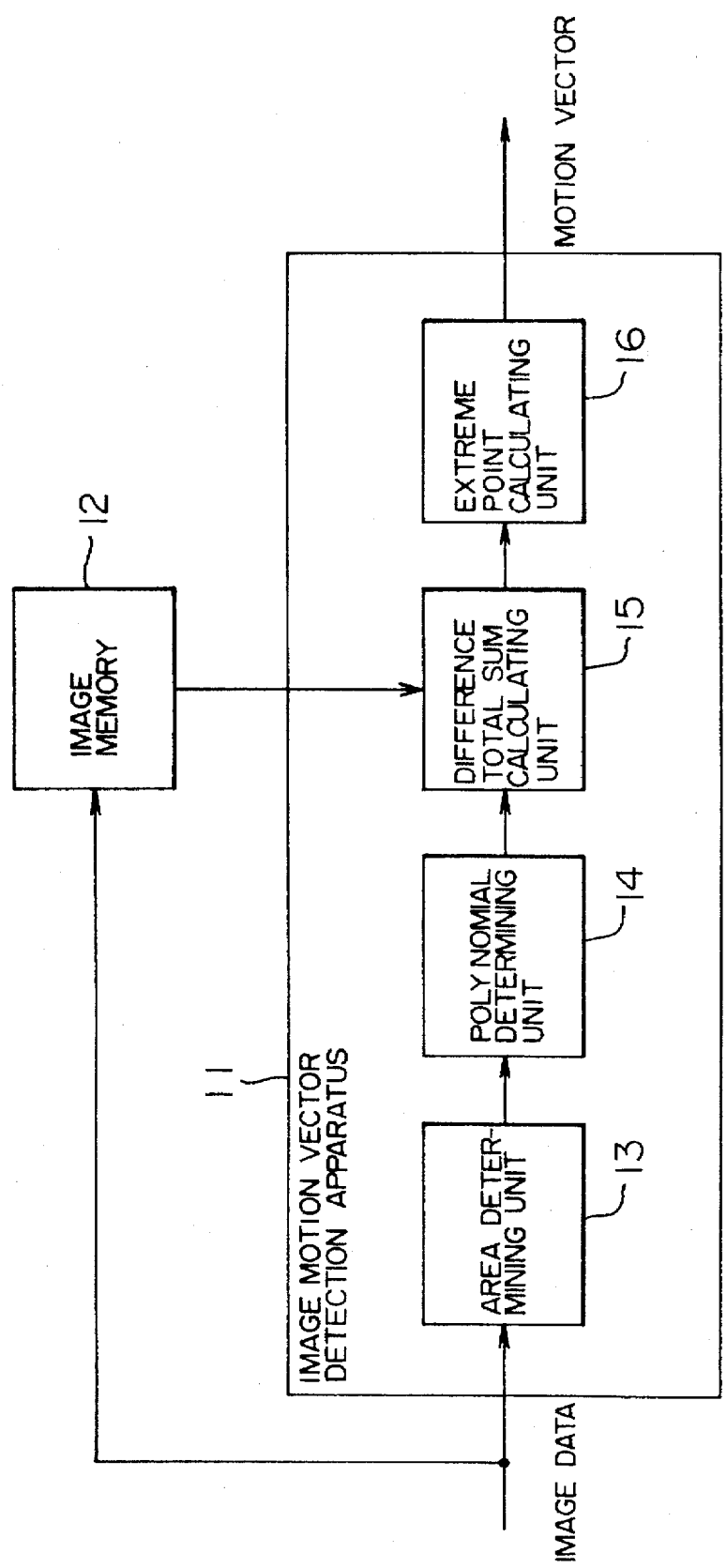

EXAPLE OF DISTVIHUTION OF DIFFERENCE TOTAL SUMS OF ACTUAL IMAGE

EXAMPLE OF APPROXIMATE CURVED SURFACE

EXAMPLE OF DISTRIBUTION OF VALUES WHICH ARE OBTAINED BY RAISING DIFFERENCE TOTAL SUMS TO THE 6-TH POWER

EXAMPLE OF APPROXIMATE CURVED SURFACE

FIG. 5
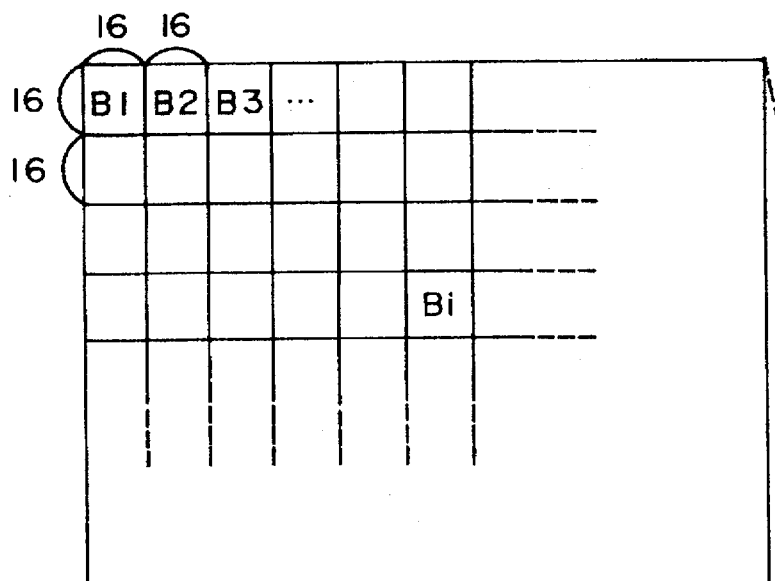
PICTURE A
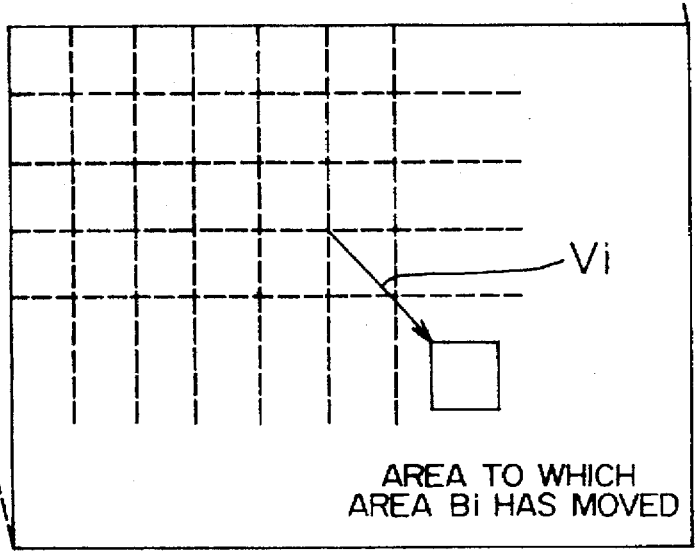
PICTURE C
AREA TO WHICH AREA Bi HAS MOVED

FIG. 6
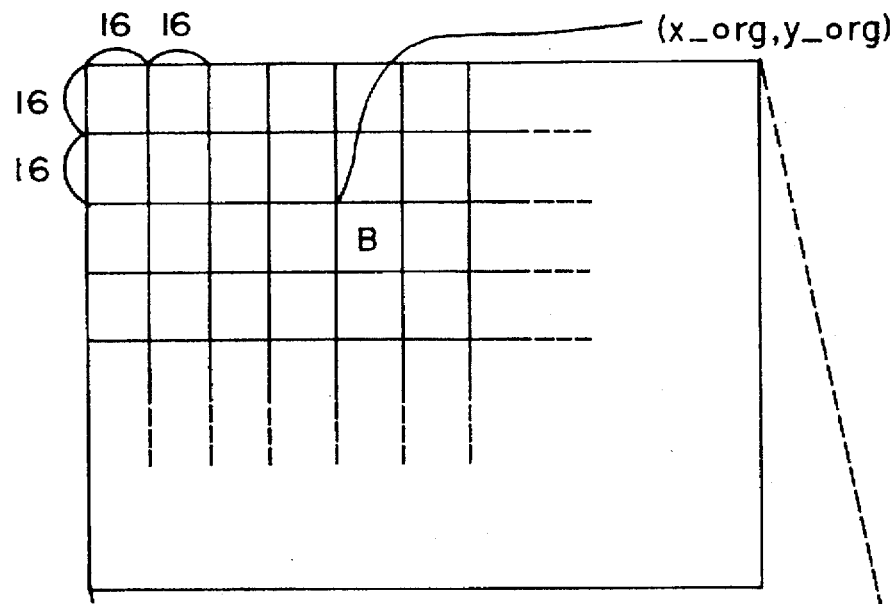
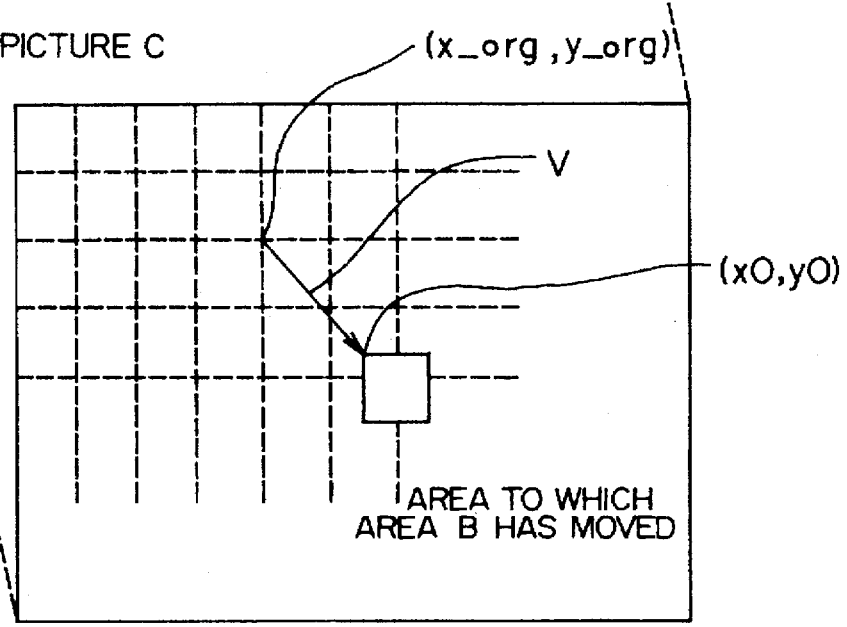

CALCULATION OF DIFFERENCE TOTAL SUM

DIFFERENCE TOTAL SUM TO THE n-TH POWER

CALCULATION OF COEFFICIENTS OF APPROXIMATE CURVED SURFACE

CALCULATION OF COORDINATES OF MINIMUM POINT $(x0, y0) = (-c/2a, -d/2b)$

METHOD AND APPARATUS FOR DETERMINING A MOTION VECTOR

BACKGROUND OF THE INVENTION

1. Field of the Invention

The present invention relates to an image motion vector detection method of detecting a movement of a partial area in a motion picture and an apparatus for use in such a method. More particularly, the present invention relates to an image motion vector detection method and an apparatus for use in such a method which are suitable for being used to detect from/to which area of an image before/after a certain image an area having an arbitrary shape and an arbitrary size on the certain image has moved in a plurality of successive images.

2. Description of Related Art

Normally, on a computer, an image is expressed in the form of two-dimensional set of picture elements each having color information. In this connection, in the case where an area in an image C (which image C occurs before/after a certain image A) an area B included in the certain image A moves. Conventionally the following method has been adopted to detect the movement.

That is, processing has been executed in such a way that a plurality of areas Dxy (x=x1, ..., xn, y=y1, ..., ym) each having the same shape and size as those of the area B in the above-mentioned image A are selected in the image C, and the total sum of absolute values of differences between the areas Dxy and the area B with respect to a plurality of picture element values (hereinafter, referred to as "the absolute value difference total sum", when applicable), and the total sum of the squares of the differences (hereinafter, referred to as "the difference squared total sum", when applicable. In addition, the absolute difference total sum and the difference squared total sum are collectively simply referred to as "the difference total sum" for short, when applicable) are obtained, and then the area Dxoyo (x1≦xo≦xn, y1≦o≦ym) having the smallest difference total sum is regarded as the area to which the area B has moved.

However, in the case where the above-mentioned conventional method is employed, when the area in the image C is intended to be obtained to which the area B has moved, which has 32 picture elements in the horizontal direction and 32 picture elements in the vertical direction as the area thereof, for example, the size (xn–x1)×(ym–y1) of the area Dxy in the image C becomes 32×32=1,024. Thus, the area Dxoyo to which the area B has moved can not be obtained if the difference total sums between the area B and the areas Dxy are not calculated by 1,024 times.

As a result, there arises a problem that the calculation amount when obtaining the area, to which the area B has moved, on the computer becomes remarkably large. Then, conventionally, in order to reduce such a calculation amount, a measure is taken by which the difference total sum is calculated on every other picture element. However, in this case as well, the sufficient effect can not be obtained.

SUMMARY OF THE INVENTION

It is therefore an object of the present invention to provide an image motion vector detection method and an apparatus for use in such a method by which the calculation amount required for detecting a motion vector of a partial area in a motion picture is capable of being significantly reduced.

In an image motion vector detection method of finding a motion vector representing a movement of an objective area in a first image of a plurality of successive images, a first image motion vector detection method according to the present invention includes the steps of:

determining a plurality of comparison areas in a second image before or after the first image;

obtaining a difference total sum between the objective area and each of the plurality of comparison areas with respect to the the plurality of comparison areas to obtain a distribution of the difference total sums;

expressing approximately the obtained distribution of the difference total sums in the form of a predetermined polynomial;

obtaining a position of an area, where the difference total sums become minimum, by using the polynomial; and treating the resultant position of the area as the position before or after the movement of the objective area, thereby detecting the motion vector representing the movement of the objective area.

In an image motion vector detection method of detecting a motion vector representing a movement of an objective area in a first image of a plurality of successive images, a second image motion vector detection method according to the present invention includes the steps of:

determining the objective area in the first image;

determining both a degree and the number of terms of a polynomial including a variable corresponding to predetermined coordinates, the polynomial approximately expressing a distribution of difference total sums obtained between comparison areas and the objective area, the comparison areas being determined in a second image before or after the first image;

determining both the number and positions in the second image of the comparison areas, which are sufficient for determining coefficients of the terms of the polynomial;

obtaining a value of the n-th power of the difference total sum obtained between the objective area and the comparison areas by using a predetermined power n, with respect to the plurality of comparison areas which have been determined in the comparison area determining step;

calculating coefficients of the polynomial by using the resultant n-th power values of difference total sums; and obtaining coordinates, in which a mininum value is obtained in the polynomial having the calculated coefficients, as coordinates of an area in the second image before or after the movement of the objective area.

Further, in an image motion vector detection apparatus for detecting a motion vector representing a movement of an objective area in a first image of a plurality of succesive images, a first image motion vector detection apparatus according to the present invention includes:

objective area determining means for determining the objective area in the first image;

polynomial determining means for determining both a degree and the number of terms of a polynomial including a variable corresponding to predetermined coordinates, the polynomial of an approximate curved surface approximately expressing a distribution of difference total sums obtained between comparison areas and the objective area, the comparison areas being determined in a second image before or after the first image;

difference total sum calculating means for determining both the number and positions in the second image of the comparison areas, which are sufficient for determining coefficients of the terms of the polynomial, and for obtaining a n-th power value of the difference total sum, obtained between the objective area and the comparison area, by using a predetermined power n, with respect to the plurality of comparison areas both the number and the positions of which have been determined; and minimum value calculating means for calculating the coefficients of the polynomial by using the obtained values of the n-th power of difference total sums, and for obtaining coordinates, in which a minimum value is obtained in the polynomial having the calculated coefficients as coordinates of an area in the second image before or after the movement of the objective area.

Furthermore, in an image motion vector detection method of detecting a motion vector representing a movement of an objective separate area, of a plurality of separate areas, in a first image of a plurality of successive images, each image of the plurality of successive images being constituted by a plurality of separate areas which are obtained by division along a plurality of reference axes intersecting one another, a third image motion vector detection method according to the present invention includes the steps of:

selecting an arbitrary number of separate areas from the plurality of separate areas of a second image before or after the first image, and obtaining a difference total sum between each of the selected separate areas and the objective separate area with respect to the selected arbitrary number of separate areas, thereby obtaining a distribution of the difference total sums;

obtaining a plurality of approximate polynomials each having one variable of variables corresponding to the plurality of reference axes by using the obtained distribution of the difference total sums;

obtaining extreme values of the obtained approximate polynomials; and detecting the motion vector representing the movement of the objective separate area on the basis of the obtained extreme values.

In addition, in an image motion vector detection apparatus for detecting a motion vector representing a movement of an objective separate area, of a plurality of separate areas, in a first image of a plurality of successive images, each image of the plurality of successive images being constituted by the plurality of separate areas which are obtained by division along first and second reference axes intersecting each other, a second image motion vector detection apparatus according to the present invention includes:

first difference total sum calculating means for selecting an arbitrary number of first separate areas, which are present on the first reference axis, of the plurality of separate areas in a second image before or after the first image, and for calculating a first difference total sum obtained between each of the first separate areas and the objective separate area with respect to the arbitrary number of first separate areas;

first polynomial determining means for substituting respectively the first difference total sums into a predetermined first polynomial including a variable corresponding to the first reference axis and a plurality of unknown first coefficients, thereby obtaining the first coefficients to specify the first polynomial;

first extreme value calculating means for obtaining a first extreme value of the specified polynomial, and for detecting a first motion vector representing the movement of the objective separate area along the first reference axis on the basis of the obtained first extreme value;

second difference total sum calculating means for selecting an arbitrary number of second separate areas, which are present on the second reference axis, of the plurality of separate areas in the second image, and for calculating a second difference total sum obtained between each of the second separate areas and the objective separate area, with respect to the arbitrary number of second separate areas;

second polynomial determining means for substituting respectively the second difference total sums into a predetermined second polynomial including a variable corresponding to the second reference axis and a plurality of unknown second coefficients, thereby obtaining the second coefficients to specify the second polynomial; and second extreme value calculating means for obtaining a second extreme value of the specified second polynomial, and for detecting a second motion vector representing the movement of the objective separate area along the second reference axis on the basis of the obtained second extreme value.

BRIEF DESCRIPTION OF THE DRAWINGS

FIG. 1 is a block diagram showing a configuration of a first embodiment of an image motion vector detection apparatus according to the present invention;

FIG. 5 is a view showing a concept of the motion vector detection in the MPEG standards;

FIG. 6 is a view showing a concept in the case where a motion vector of a certain area is detected;

DESCRIPTION OF THE PREFERRED EMBODIMENTS

Figure 2A:
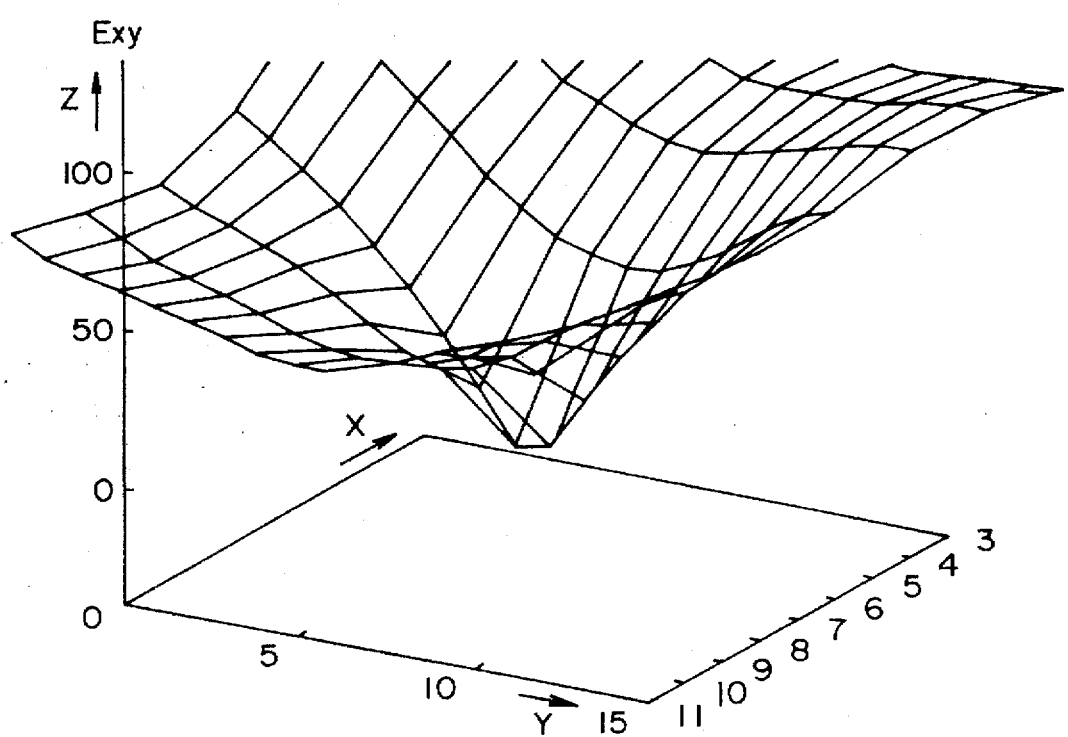
FIGS. 2A and 2B are respectively views showing an example of a distribution of the difference total sums of an actual image and an example of a curved surface in which the distribution of the difference total sums is approximated.

A first embodiment of an image motion vector detection apparatus according to the present invention will hereinafter be described in detail with reference to a block diagram shown in FIG. 1. An image motion vector detection apparatus 11 according to the present embodiment includes an area determining unit 13 to which an image data is inputted, a polynomial determining unit 14 to which an output signal of the area determining unit 13 is inputted, a difference total sum calculating unit 15 to which an output signal of the polynomial determing unit 14 is inputted, and an extreme point calculating unit 16 to which an output signal of the difference total sum calculating unit 15 is inputted and which serves to output a motion vector. The difference total sum calculating unit 15 is also connected to an external image memory 12 in which the image data is stored.

Figure 2B:
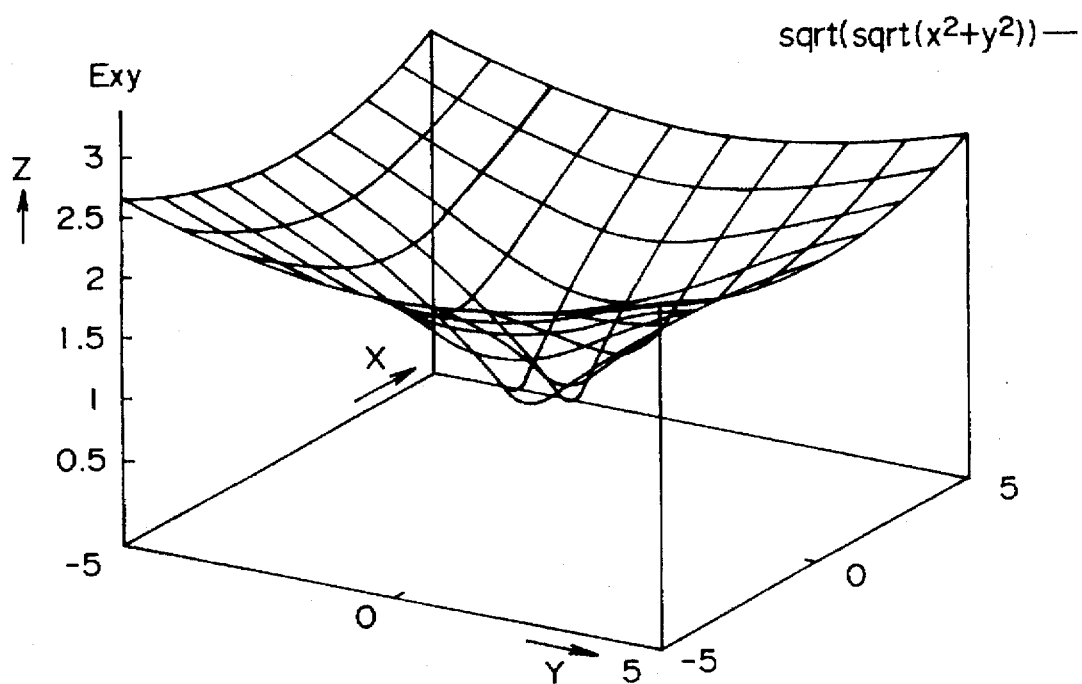

Prior to the description of the operation of the image motion vector detection apparatus 11, the description will hereinbelow be given with respect to an example of a distribution of difference total sums of an actual image and an example of a curved surface in which the distribution of the difference total sums is approximated, with reference to FIGS. 2A and 2B. An area which is present in an image A is defined as an area B (an objective area), and an image before (or after) the image A is defined as an image C. If difference total sums Exy between the area B and areas Dxy (comparison areas) each having the same size as that of the area B in the image C are plotted along the z-axis, and also the positions of the areas Dxy in the image C are plotted along the x-y plane, a distribution of the difference total sums of the actual image becomes a distribution as shown in FIG. 2A, for example. This distribution of the difference total sums can be, as shown in FIG. 2B, expressed approximately in the form of a curved surface in the x-y-z space in which the difference total sum Exoyo corresponding to an area Dxoyo to which the area B has moved takes a minimum value on the z-axis.

Figure 3A:
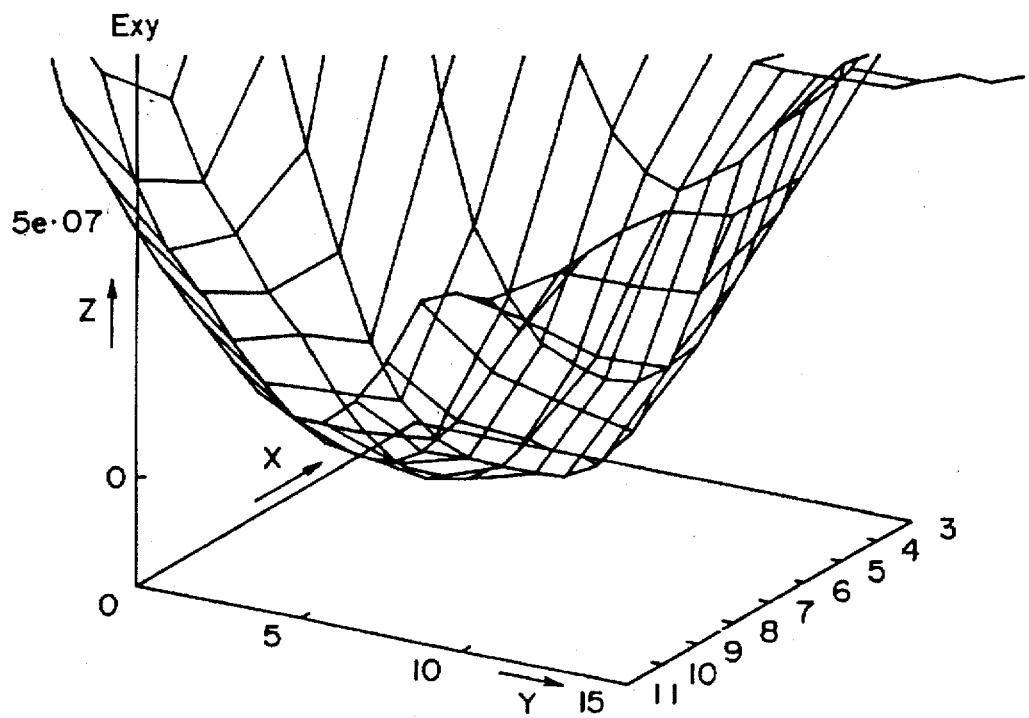
FIGS. 3A and 3B are respectively views showing an example of a distribution of the values each of which is obtained by raising each of the difference total sums of the actual image to the 6-th power and example of a curved surface in which the distribution of the difference total sums is approximated.
Figure 3B:
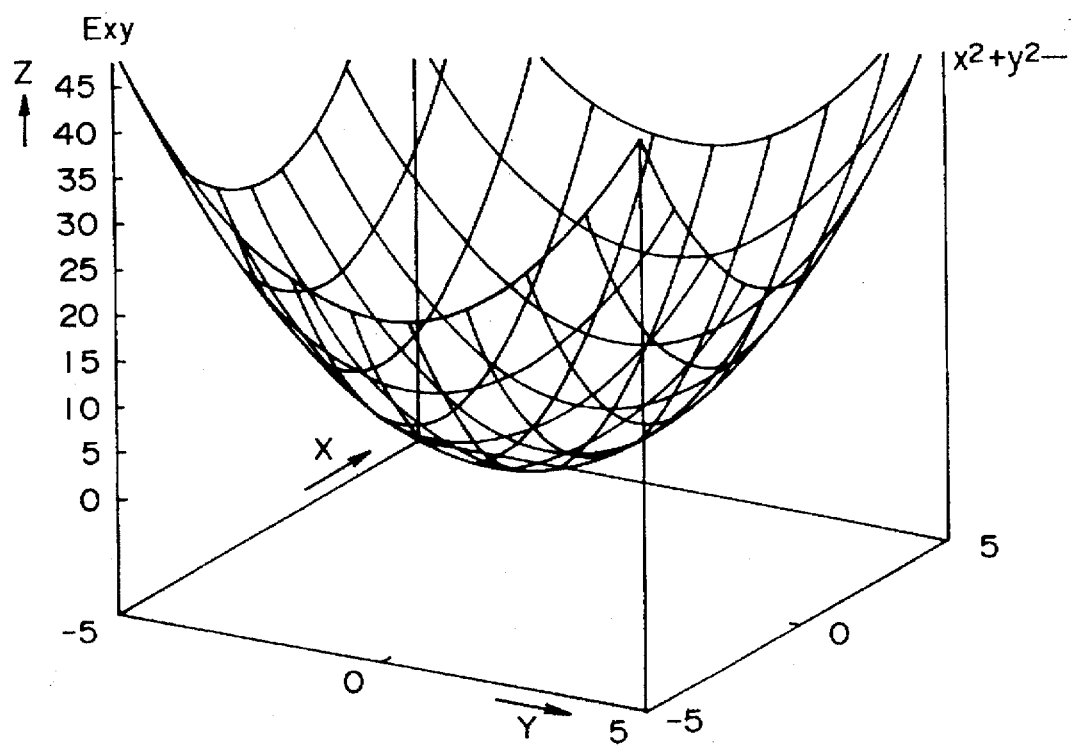

Utilizing the tendency of the distribution of the difference total sums, in the case where the values of the n-th power of the difference total sums Exy are plotted along the z-axis, an expression of the curved surface in which the distribution of the values of the n-th power of the difference total sums Exy can be expressed in the form of a polynomial such as a quadratic expression relating to x and y. For example, the distribution of the difference total sums obtained in the case where each of the above-mentioned difference total sums Exy is raised to the 6-th power is as shown in FIG. 3A. In addition, the curved surface which is obtained by approximating the distribution of the difference total sums is as shown in FIG. 3B. The approximate expression of the curved surface shown in FIG. 3B is given by $(x^2+y^2)$.

The present embodiment aims to pay attention to the approximate curved surface of the distribution of the difference total sums and also to utilize it for detecting the motion vector of a partial area in the motion picture. That is, the present embodiment is such that the expression of the approximate curved surface of the distribution of the difference total sums is obtained, and the position of the area Dxoyo having the minimum difference total sum Exoyo in the image C is obtained by using the resultant expression of the approximate curved surface, and the position of the resultant area Dxoyo is treated as the area to which the area B has moved.

Next, the description will hereinbelow be given with respect to a method of detecting an area movement amount by utilizing the image motion vector detection apparatus 11 with reference to a flow chart shown in FIG. 4.

In Step S1, by the operation of the area determing unit 13, the shape and size of the area B which becomes an object of the detection of the motion vector, and the position thereof in the image A are respectively determined. The shape, size and position of the area B can be arbitrarily selected. However, by taking the labor required for the calculation on the computer into consideration, a rectangular area in which the length of the side is a multiple of 8, such as 16×16 or 32×16 may be selected as such an area B in many cases.

In Step S2, by the operation of the polynomial determining unit 14, in the case where the difference total sum between the area B in the image A and the area D in the image C is considered as the value of the coordinates of the area D in the image C, both the degree and the number of terms of the polynomial expressing the curved surface in which the distribution situation of the coordinate values is properly approximated are determined. In this connection, both the degree and the number of terms of this polynomial may be arbitrarily selected. If both the degree and the number of terms of the polynomial are made large, the labor required for the calculation therefor is increased. However, at the same time, the degree of approximation is also increased. Actually, by taking this balance into consideration, the polynomial in which the degree is 2 and the number of terms is 5 or 6 may be employed in many cases.

In Step S3, by the operation of the difference total sum calculating unit 15, firstly, the number N ($1 \leq i \leq N$) the positions of areas Di in the image C are determined. In this connection, the difference total sums will be obtained between the area B and the areas Di. The number N of the areas Di is the number of equations required for determining the coefficients of the polynomial which has been determined in Step S2, and in its turn the number which is necessary for calculating a large number of difference total sums Ei enough to produce the predetermined number of equations.

For example, when the number of terms of the polynomial is 5, the number N of areas Di needs to be at least equal to or larger than 5. In this connection, in the case where the value equal to or larger than that value is employed, the accuracy can be further improved by using effectively the redundant difference total sums on the basis of the method such as the method of least squares.

Next, in Step S4, the difference total sum calculating unit 15 calculates the difference total sums Ei between the areas Di ($1 \leq i \leq N$) in the image C, which has been determined in Step S3, and the area B in the image A by utilizing the image data which is temporarily stored in the image memory 12, and then raises each of the difference total sums Ei to the n-th power with a predetermined power n. Now, each of the difference total sums Ei is raised to the n-th power in order to enable the distribution of the difference total sums to be expressed in the form of the approximate curved surface expressed by the simple polynomial.

Although the value n is changed depending on the nature of the objective image, normally, it takes an integral number in the range of 1 to 8 or so. The necessity of this range results from the fact that if n<1, the approximation of the approximate curved surface is limited to the narrow range and hence in the case of the image in violent motion, it becomes difficult in some cases to follow the violent motion of the image. In addition, the necessity of that range also results from the fact that if n>8, the value obtained by raising the different total sum to the n-th power may depart from the range, which can be normally managed by the computer, in some cases.

In Step S5, by the operation of the extreme point calculating unit 16, the coefficients of the polynomial, which was determined in Step S2, of the curved surface which is obtained by approximating the distribution of the difference total sums are calculated by using each of the values of the n-th power of the difference total sums Ei, which has been calculated in Step S4.

Then, in next Step S6, the coordinate values of the position where the polynomial takes a minimum value in the image C are calculated on the basis of the coefficients of the polynomial, which have been obtained in Step S5. Then, with respect to the area B in the image A, the motion vector between the image A and the image C is calculated on the basis of the coordinate values thus calculated. Incidentally, the calculation methods which are used in Steps S5 and S6 may be arbitrarily selected.

By executing the processings of Steps S1–S6, which have been described above, in this order, it is possible to detect the position of the area Dxoyo in the image C, to which the area B in the image A has moved, with a little calculation amount. Then, on the basis of both the position of the area Dxoyo in the image C and the position of the area B in the image A, the motion vector is obtained to be outputted to a processing circuit (not shown) in a next stage.

Next, the description will hereinbelow be given with respect to the case where the image motion vector detection apparatus 11 of the present embodiment is, for example, applied to the detection of the motion vector which is required when performing the compression of the motion pictures according to the MPEG (Digital Motion pictures Compression Format Standards).

As shown in FIG. 5, in the motion pictures compression by the MPEG format, the picture A is divided into a plurality of areas (macro blocks) B1, B2, B3, . . . each consisting of 16×16 picture elements. Next, with respect to the individual areas Bi, the area, in the picture C before (or after) the picture A, to which the area of interest has been moved needs to be obtained and also its motion vector (the movement amount) Vi needs to be obtained.

Now, it is considered in FIG. 6 that the coordinates (xo, yo) of the area in the picture C, to which the macro block B, having the coordinates (x_org, y_org), of a plurality of macro blocks in the picture A has moved, are detected between the picture A and the picture C, thereby obtaining the motion vector V.

Figure 4:
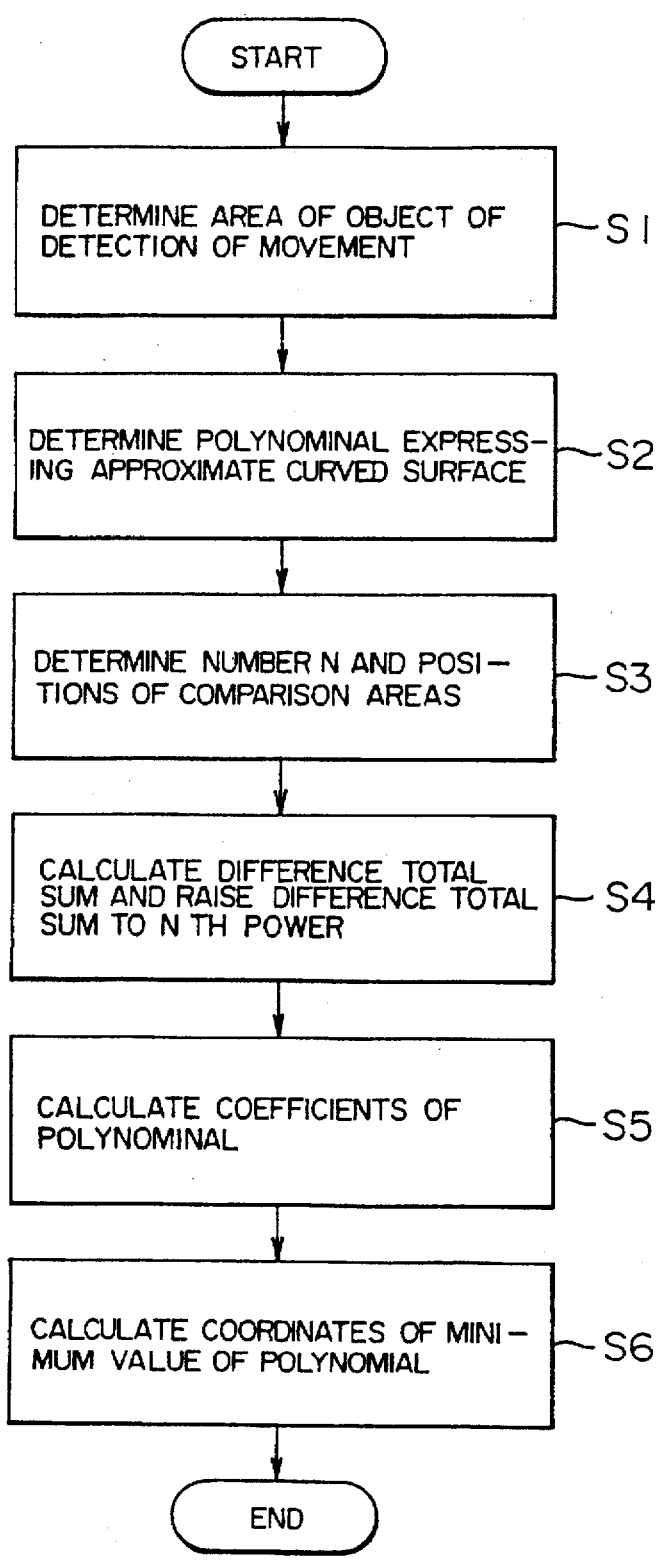
FIG. 4 is a flow chart useful in explaining a method of detecting an area mevement amount by utilizing the image motion vector detection apparatus shown in FIG. 1.

The processing of selecting the macro block (the area) B having the coordinates (x_org, y_org) from a plurality of macro blocks in the picture A corresponds to the processing in Step S1 shown in FIG. 4. Next, when the polynomial of the approximate curved surface is to be determined as the processing in Step S2, the various curved surfaces are considered for the approximate curved surface of the absolute value difference total sums. However, for the sake of simplicity, the simple quadratic equation as the following expression (1) will be employed here.

$$Z = E^n_{xy} = ax^2 + by^2 + cx + dy + e \qquad (1)$$

where x and y represent the position of the area Dxy in the picture C to which the area B has moved, $E^n_{xy}$ is the value of the n-th power of the difference total sum, obtained between the area Dxy and the area B, a, b, c, d and e are unknown coefficients, and n is a known constant.

In this case, the degree of the polynomial is 2 and the number of terms thereof is 5. In addition, the known constant n in the expression (1) is used in the processing in Step S4.

With respect to the processing in Step S3, since the unknown five coefficients are included in the expression (1), the number N of comparison areas Di, which become necessary in the picture C, is kept to a necessary minimum, i.e., 5 and hence the areas are designated D1, D2, . . . , D5, respectively. In addition, the coordinates in the picture C of the areas D1 to D5 are designated (x1, y1), . . . , (x5, y5), respectively. Those areas D1 to D5 are shown in FIG. 7A.

Figure 7A:
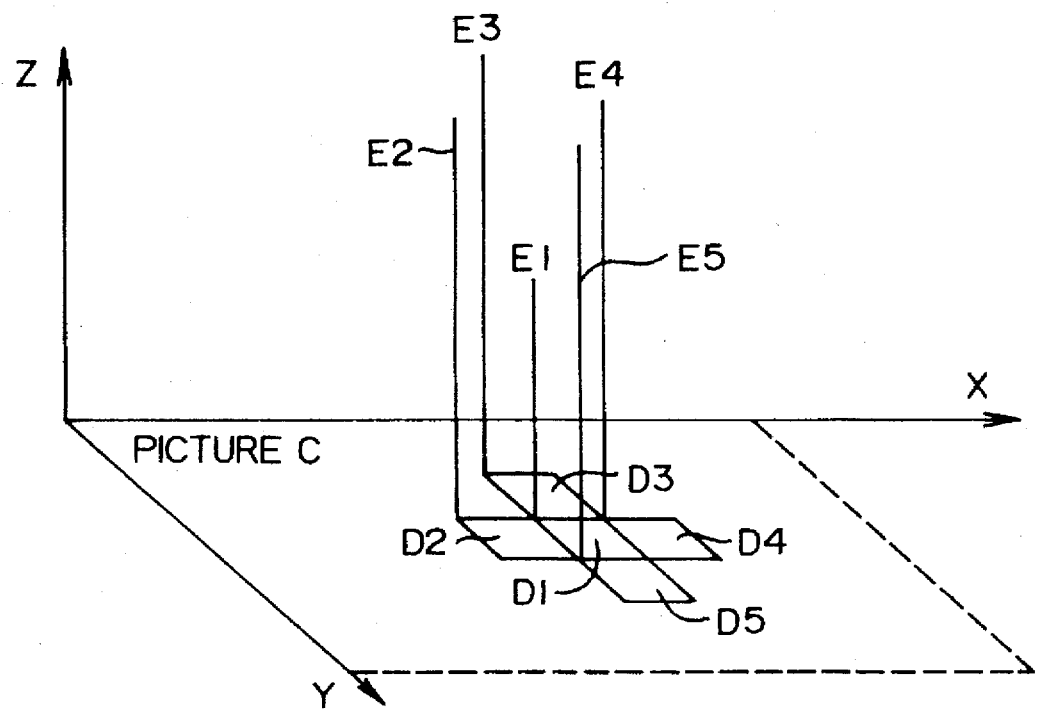
FIGS. 7A and 7B are respectively views showing a situation in which the difference total sums and each of the values of the n-th power of the difference total sums are calculated.
Figure 7B:
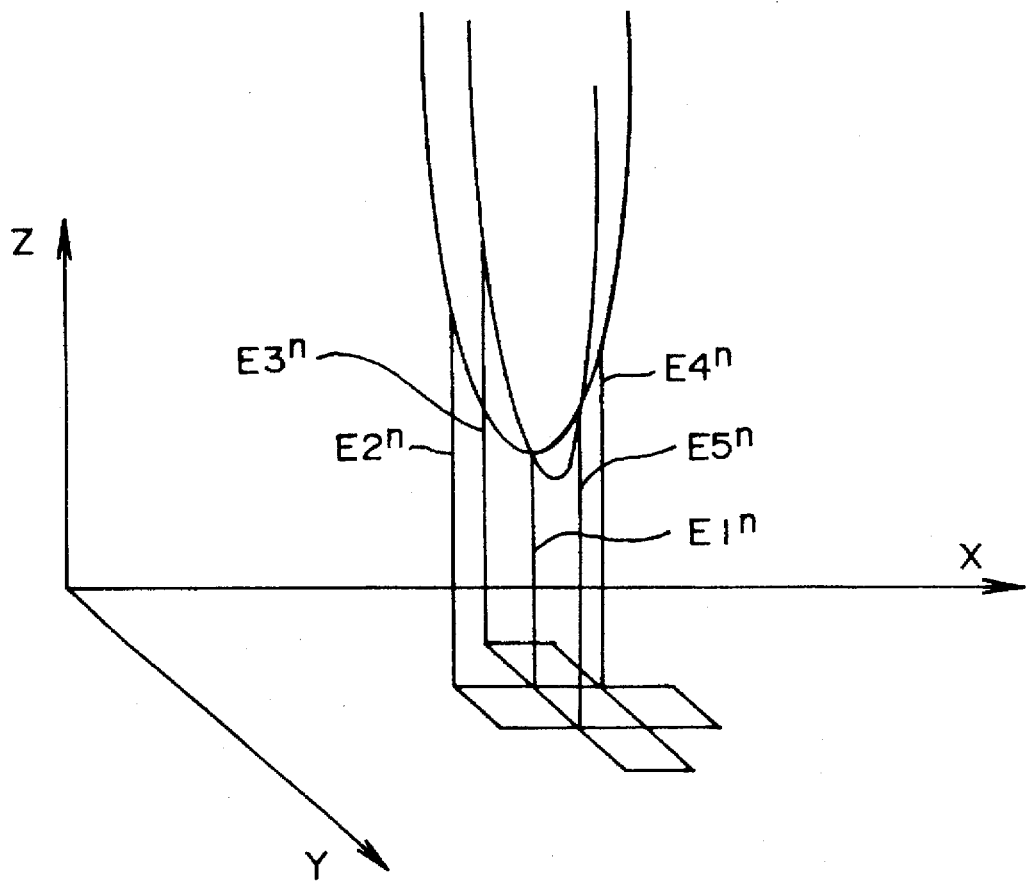

Next, in Step S4, firstly, as shown in FIG. 7A, the absolute value difference total sums E1 to E5 between the area B in the picture A and the five areas D1 to D5 in the picture C are calculated, respectively. Then, as shown in FIG. 7B, each of the absolute value difference total sums E1 to E5 is raised to the n-th power by using a predetermined power n. The value of the power n as the known constant, which appears in the expression (1), is determined in accordance with the nature of the motion of the objective motion picture. In general, it is understood from the results of the experiments that the power n is preferably made larger for the violently motion picture, and the value of the power n is made smaller for the gently motion picture.

As a result of the processings in Steps S1 to S4 till now, the five equations can be obtained from the expression (1). Those equations can be collectively expressed as follows:

$$\begin{bmatrix} E_1^n \\ E_2^n \\ E_3^n \\ E_4^n \\ E_5^n \end{bmatrix} = \begin{bmatrix} x_1^2 & y_1^2 & x_1 & y_1 & 1 \\ x_2^2 & y_2^2 & x_2 & y_2 & 1 \\ x_3^2 & y_3^2 & x_3 & y_3 & 1 \\ x_4^2 & y_4^2 & x_4 & y_4 & 1 \\ x_5^2 & y_5^2 & x_5 & y_5 & 1 \end{bmatrix} \begin{bmatrix} a \\ b \\ c \\ d \\ e \end{bmatrix} \qquad (2)$$

From the expression (2), the following expression (3) can be obtained.

$$\begin{bmatrix} a \\ b \\ c \\ d \\ e \end{bmatrix} = \begin{bmatrix} x_1^2 & y_1^2 & x_1 & y_1 & 1 \\ x_2^2 & y_2^2 & x_2 & y_2 & 1 \\ x_3^2 & y_3^2 & x_3 & y_3 & 1 \\ x_4^2 & y_4^2 & x_4 & y_4 & 1 \\ x_5^2 & y_5^2 & x_5 & y_5 & 1 \end{bmatrix}^{-1} \begin{bmatrix} E_1^n \\ E_2^n \\ E_3^n \\ E_4^n \\ E_5^n \end{bmatrix} \qquad (3)$$

Figure 8:
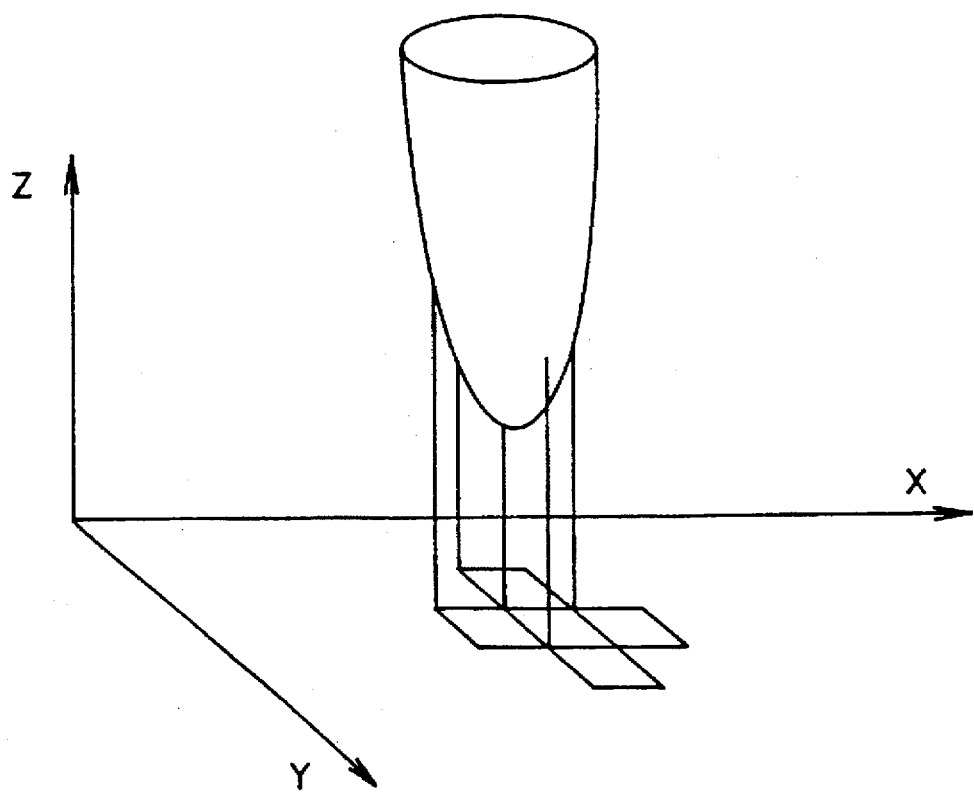
FIG. 8 is a view showing a situation in which the coefficients of an approximated curved surface are calculated.

In Step S5, the coefficients a, b, c, d and e in the polynomial in the approximate curved surface of the distribution of the absolute value difference total sums as shown in FIG. 8 are obtained on the basis of the above-mentioned absolute value difference total sums E1 to En by using the expression (3) obtained in the above manner.

Next, the above-mentioned expression (1) can be transformed into an expression (4):

$$z = E^n_{xy} = a(x-xo)^2 + b(y-yo)^2 + f \qquad (4)$$

where x and y represent the position of the area Dxy in the picture C, a, b and f are unknown coefficients, and xo and yo represent a minimum point of the curved surface.

Now, the coordinates (xo, yo) are considered to be the coordinates of the minimum point of the approximate curved surface of the distribution of the absolute value difference total sums, i.e., the coordinates of the area Dxoyo in the picture C in which the absolute value difference total sums for the macro block B is considered to be minimum. By comparing the expression (4) with the expression (1), the following expression is obtained.

$$xo = -c/2a, \quad yo = -d/2b \quad (5)$$

Figure 9:
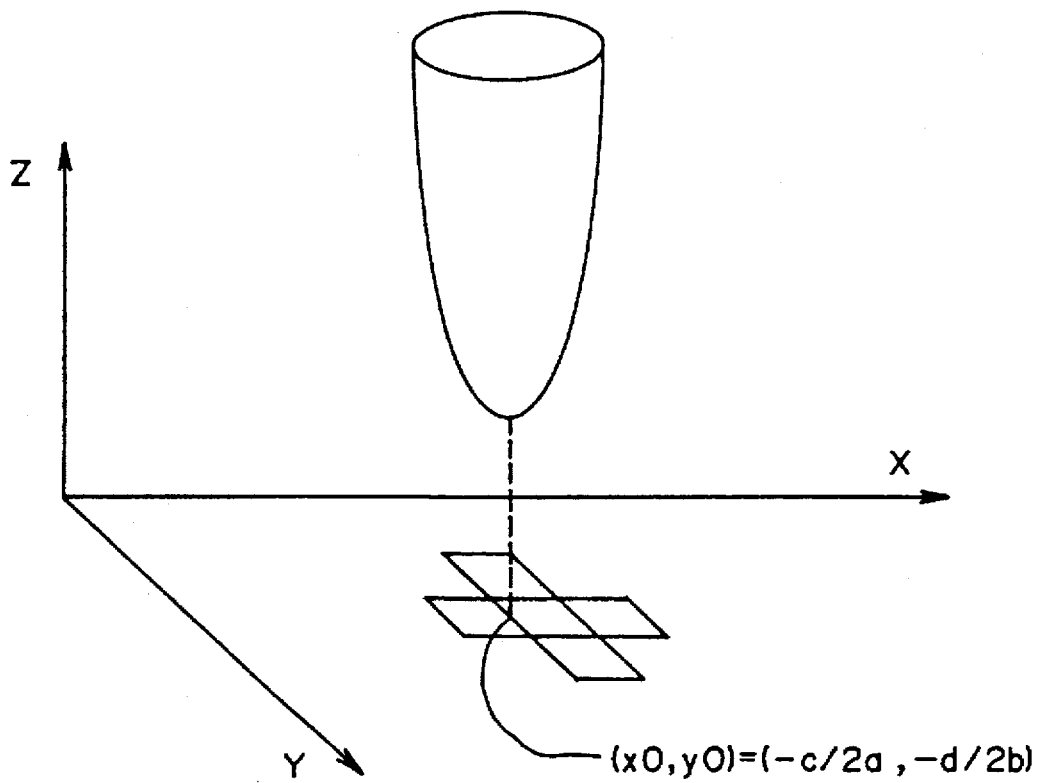
FIG. 9 is a view showing a situation in which the coordinates of a minimum point are calculated.

In Step S6, the coordinates (xo, yo) giving the minimum value as shown in FIG. 9 are obtained by using the expression (5) and the coefficients a, b, c and d which have been obtained in Step S5. At this time, the motion vector V=(Vx, Vy) for the picture C of the macro block (the area) B to be obtained can be obtained from an expression (6).

$$(Vx, Vy) = (xo - x\_org, yo - y\_org) \quad (6)$$

As described above, by executing the processings of the six Steps S1 to S6 in this order, it is possible to obtain the motion vector.

As described above, in the present embodiment, it is necessary to calculate the unknown coefficients a, b, c and d and the coordinates (xo, yo) of the area to which the area B has moved. However, the required number of calculations for the absolute value difference total sums is only 5. As a result, the amount of calculation can be reduced to about 1/100th times as small as that of the conventional method.

As set forth hereinabove, according to the present embodiment, the distribution of the difference total sums, which are obtained between the objective area for which the motion vector is to be obtained and its comparison areas, is approximated in the form of the polynomial expressing the approximate curved surface, and the position where the difference total sums become minimum is obtained by using that polynomial. The number of difference total sums required for obtaining the approximate curved surface is determined in accordance with the shape of the approximate curved surface. In this connection, according to the present embodiment, the number of difference total sums, which must be calculated in order to obtain the motion vector of a certain area in the image, becomes very small as compared with the conventional method wherein the difference total sums are obtained on every picture element or every other picture element. Therefore, the total calculation amount required for obtaining the motion vector of the image can be greatly reduced, and hence the speed of the processing can be made higher.

Figure 10:
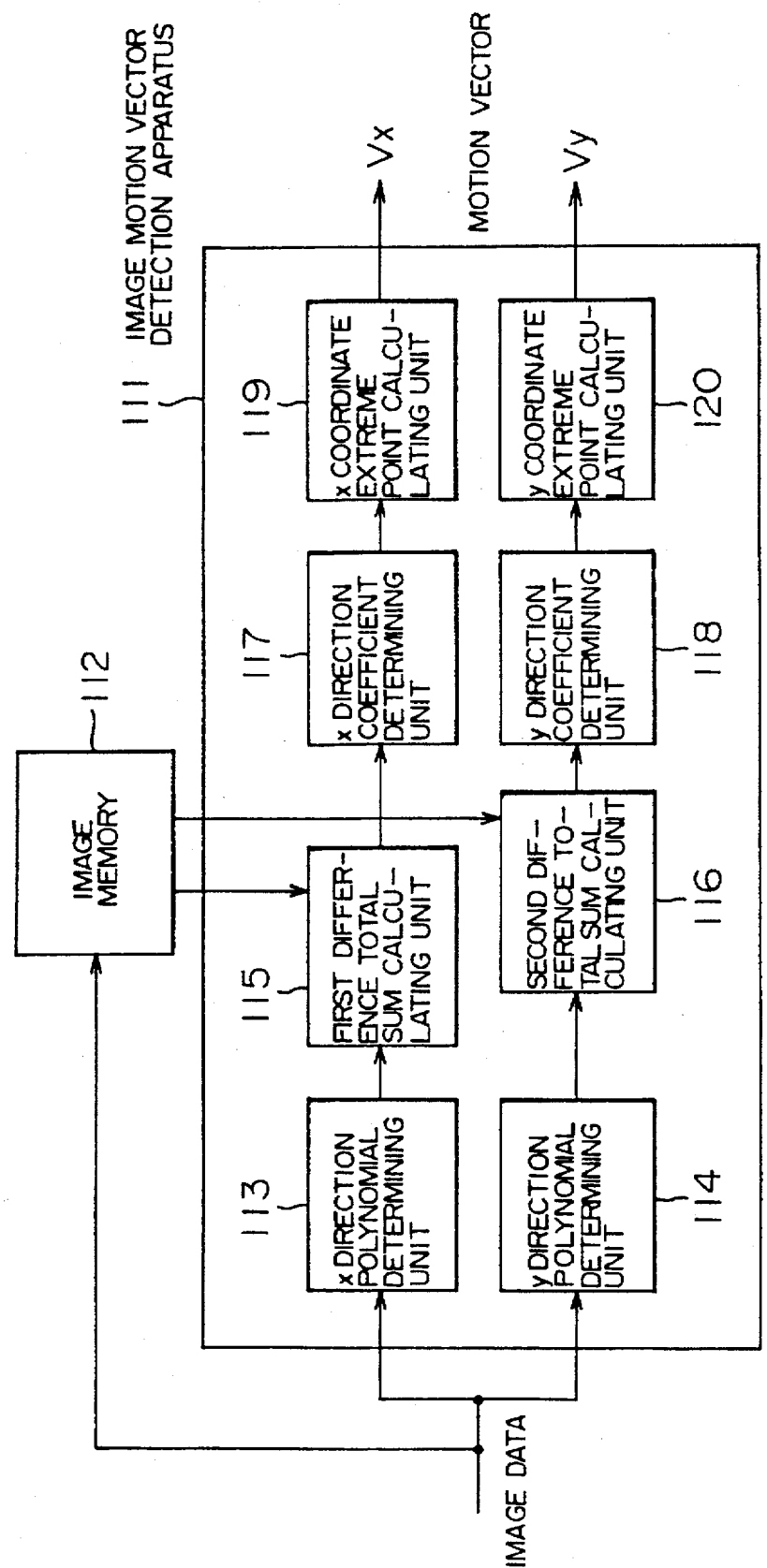
FIG. 10 is a block diagram showing a configuration of a second embodiment of an image motion vector detection apparatus according to the present invention.

A second embodiment of the image motion vector detection apparatus according to the present invention will hereinafter be described in detail with reference to a block diagram shown in FIG. 10. An image motion vector detection apparatus 111 of the present embodiment includes: an x-direction polynomial determining unit 113 to which an image data is inputted; a first difference total sum calculating unit 115 to which an output signal of the x-direction polynomial determining unit 113 is inputted; an x-direction coefficient determining unit 117 to which an output signal of the first difference total sum calculating unit 115 is inputted; an x-coordinate extreme point calculating unit 119 to which an output signal of the x-direction coefficient determining unit 117 is inputted and which serves to output a motion vector Vx of the x-direction; a y-direction polynomial determining unit 114 to which the image data is inputted; a second difference total sum calculating unit 116 to which an output signal of the y-direction polynomial determining unit 114 is inputted; a y-direction coefficient determining unit 118 to which an output signal of the second difference total sum calculating unit 116 is inputted; and a y-coordinate extreme point calculating unit 120 to which an output signal of the y-direction coefficient determining unit 118 is inputted and which serves to output a motion vector Vy of the y-direction. The first and second difference total sum calculating units 115 and 116 are also connected to an external image memory 112 in which the image data is stored.

Next, the description will hereinbelow be given with respect to a method of detecting the area movement amount by utilizing the image motion vector detection apparatus 111 with reference to a flow chart shown in FIG. 11. Incidentally, all the processings as will be described below may be executed independently (i.e., in parallel) with respect to the x-direction and the y-direction.

In Step S11, by the operation of both the x-direction polynomial determining unit 113 and the y-direction polynomial determining unit 114, in the case where the difference total sums between the area B in the picture A and the area D in the picture C after the movement of the picture B are considered as the values of the coordinates of the area D in the picture C, the expression of the polynomial expressing the quadratic curve representing the distribution situation of those coordinate values is determined. As for the form of that polynomial, in the case of the quadratic curve, any form such as a parabola, a circle or an ellipse may be selected.

In Step S12, in both the first difference total sum calculating unit 115 and the second difference total sum calculating unit 116, the difference total sums Ei between the areas Di ($1 \leq i \leq 3$) in the picture C and the area B in the picture A are respectively calculated by using the image data which is temporarily stored in the image memory 112.

In Step S13, by the operation of both the x-direction coefficient determining unit 117 and the y-direction coefficient determining unit 118, the coefficients of the polynomial of the quadratic curve which was determined in Step S11 and specifies the distribution of the difference total sums are calculated by using the difference total sums Ei which have been calculated in Step S12.

In Step S14, in both the x-coordinate extreme point calculating unit 119 and the y-coordinate extreme point calculating unit 120, the values of the coordinates of the position where the above-mentioned polynomial takes a minimum in the picture C are calculated on the basis of the coefficients of the polynomial which have been obtained in Step S13. Then, with respect to the area B in the picture A, the x-direction motion vector Vx and the y-direction motion vector Vy obtained between the picture A and the picture C are respectively calculated on the basis of the above-mentioned coordinate values. Incidentally, the calculation method which is used in Steps S13 and S14 may be arbitrarily selected.

By executing the processings of Steps S11 to S14 in this order, the x-direction motion vectors Vx and the y-direction motion vector Vy are respectively obtained independently of each other on the basis of both the position of the area Dxoyo in the picture C to which the area B in the picture A has moved and the position of the area B in the picture A, and then are outputted to a processing circuit (not shown) in the next stage.

Next, the description will hereinbelow be given with respect to the case where the image motion vector detection apparatus 111 of the present embodiment is, for example, applied to the detection of the motion vector which is required when performing the compression of the motion picture according to the MPEG (Digital Motion Pictures Compression Format Standards).

Figure 12:
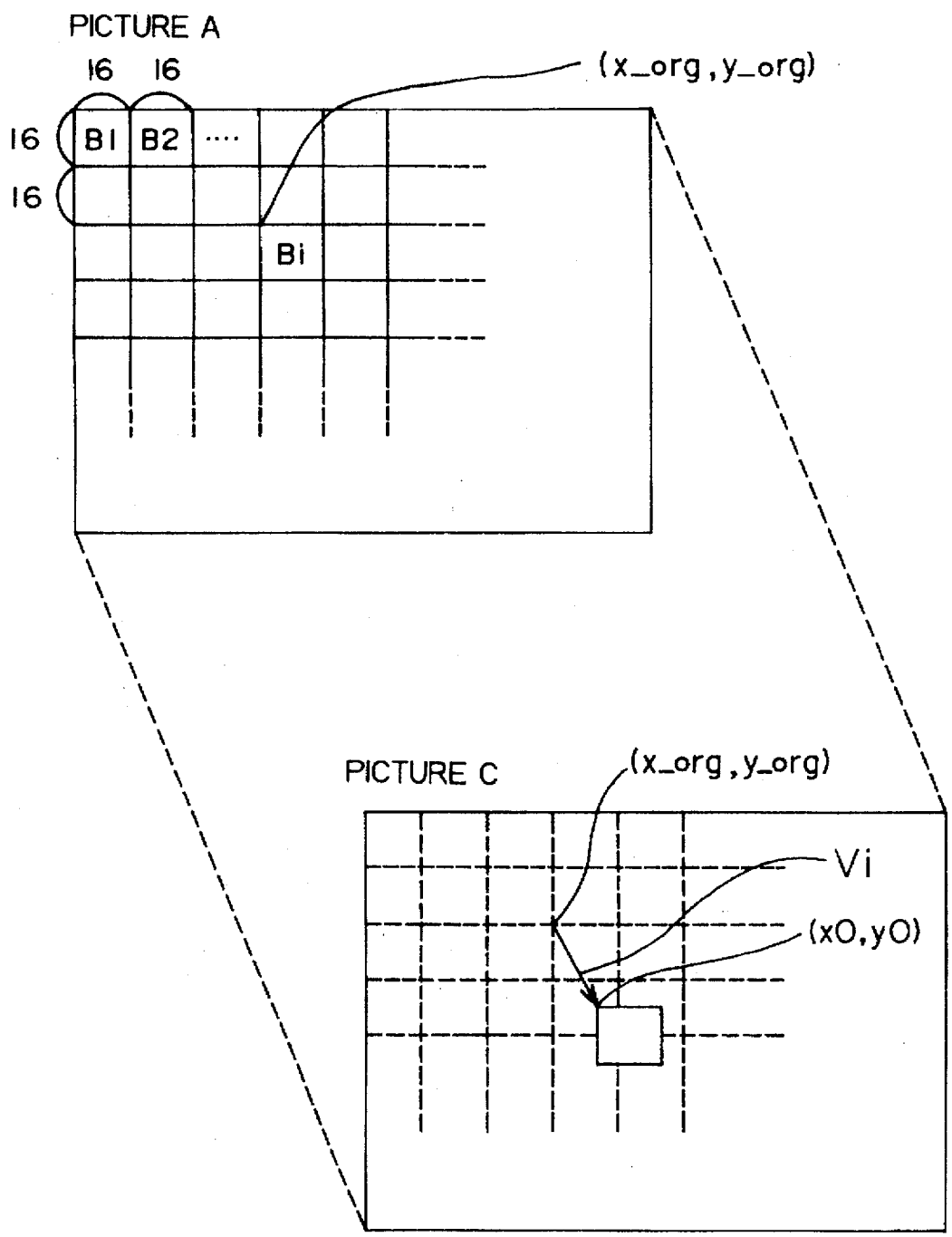
FIG. 12 is a view showing a concept of the motion vector detection in the MPEG standards.

As shown in FIG. 12, in the motion picture compression according to the MPEG format, an image A is divided into a plurality of areas (macro blocks) B1, B2, B3 . . . each consisting of 16×16 picture elements. Then, it is required that the area, in the picture C before or after the picture A, to which the area Bi has moved is obtained to calculate its motion vector (movement amount) Vi.

Now, in FIG. 12, it is considered that the coordinates (xo, yo) of the area in the picture C to which the macro block Bi, having the coordinates (x_org, y_org), of the plurality of macro blocks in the picture A has moved is detected between the picture A and the picture C to obtain the motion vector Vi.

Figure 11:
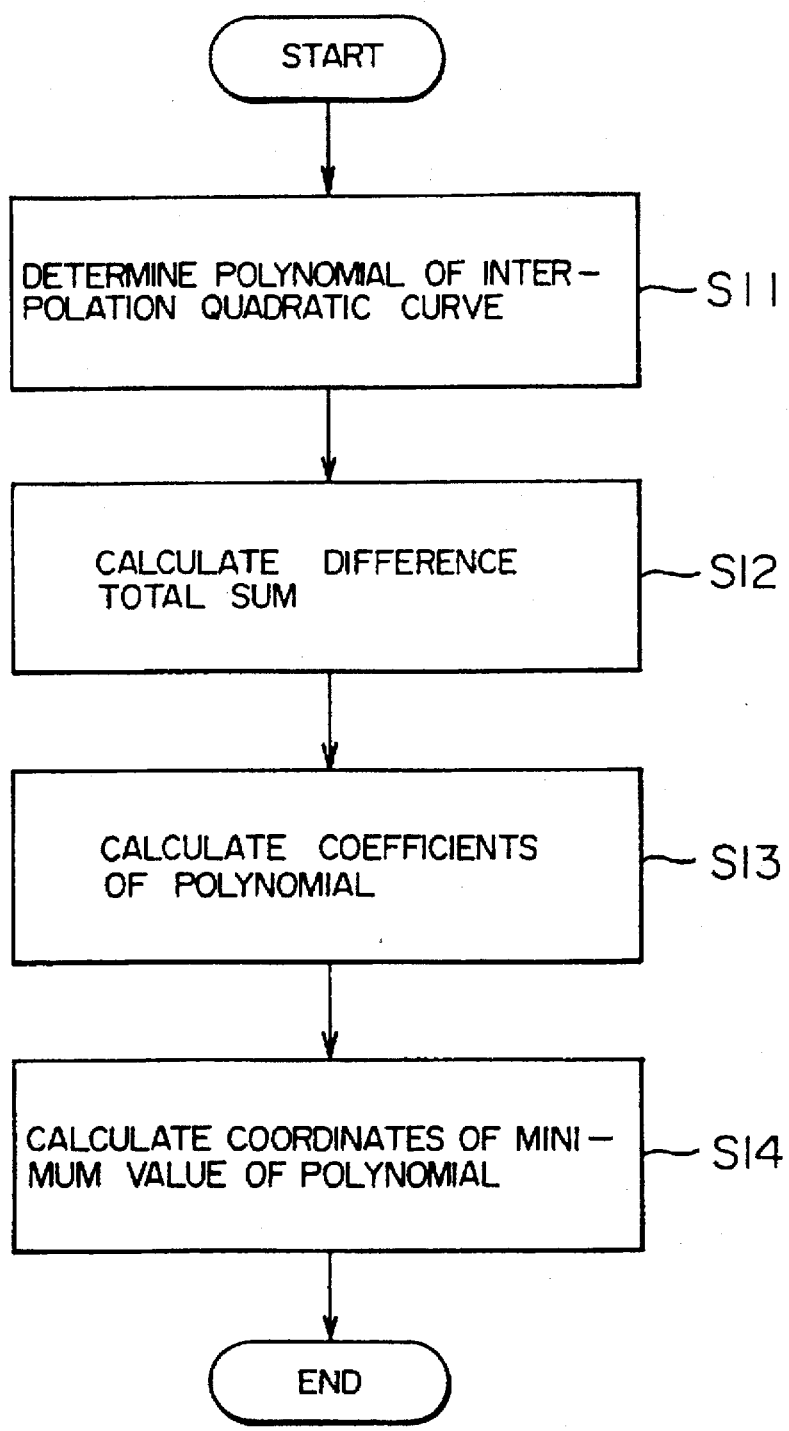
FIG. 11 is a flow chart useful in explaining a method of detecting an area movement amount by utilizing the image motion vector detection apparatus shown in FIG. 10.

In the processing in Step S11 shown in FIG. 11, when the polynomial of the quadratic curve is to be determined, the various functions may be considered for the approximate curve of the difference total sums. However, in the present embodiment, for the sake of simplicity, the quadratic equations as the following expressions (7) and (8) are employed.

$$z = Exy = ax^2 + bx + c \quad (7)$$

$$z = Exy = dy^2 + ey + f \quad (8)$$

where x and y represent the position of Dxy in the picture C to which the area B has moved, Exy is the difference total sum obtained between the area Dxy and the area B, and a, b, c, d, e and f are unknown coefficients.

In this case, the form of the polynomial is the parabola function, and the number of terms is 3. Therefore, the number of information of the difference total sum Exy, which is required for determining the coefficients of the expressions (7) and (8), is respectively 3. As shown in FIG. 11, since the expressions (7) and (8) are processed independently of each other, it is also possible to select any one of the different polynomials.

Figure 13:
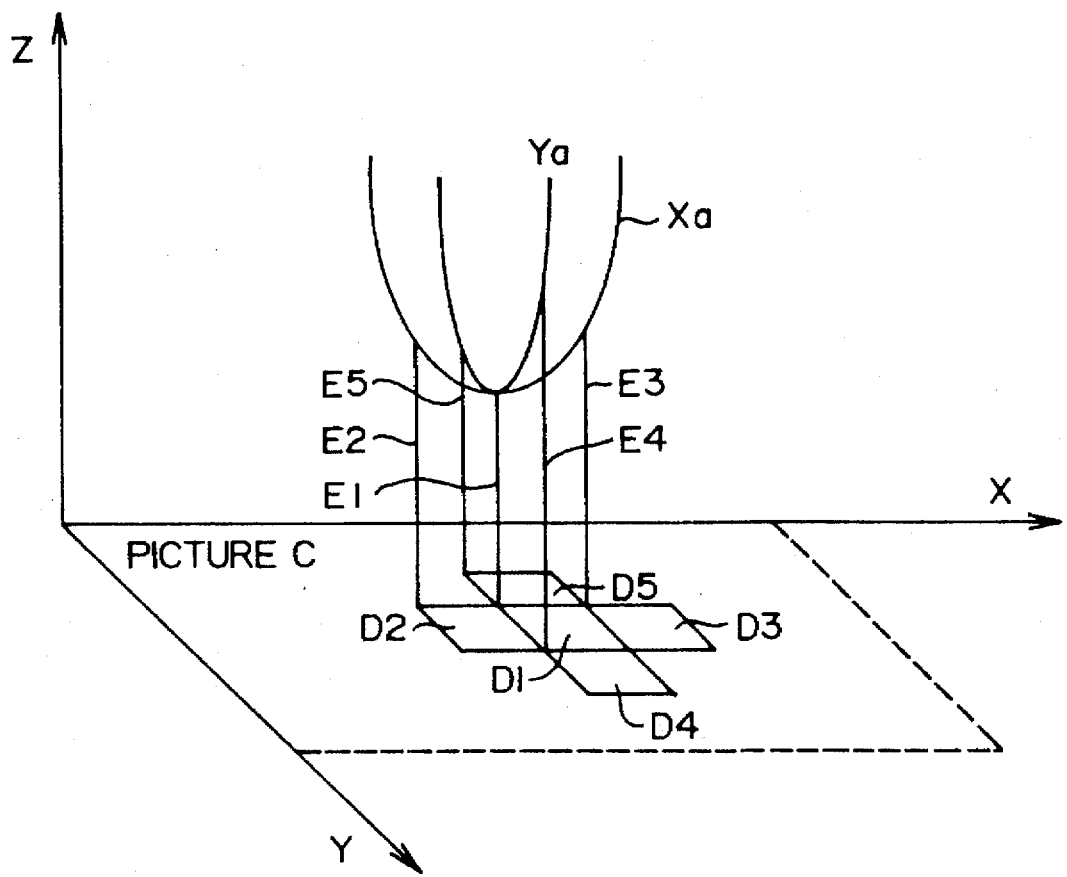
FIG. 13 is a view showing a situation in which the difference total sums are calculated.
Figure 14:
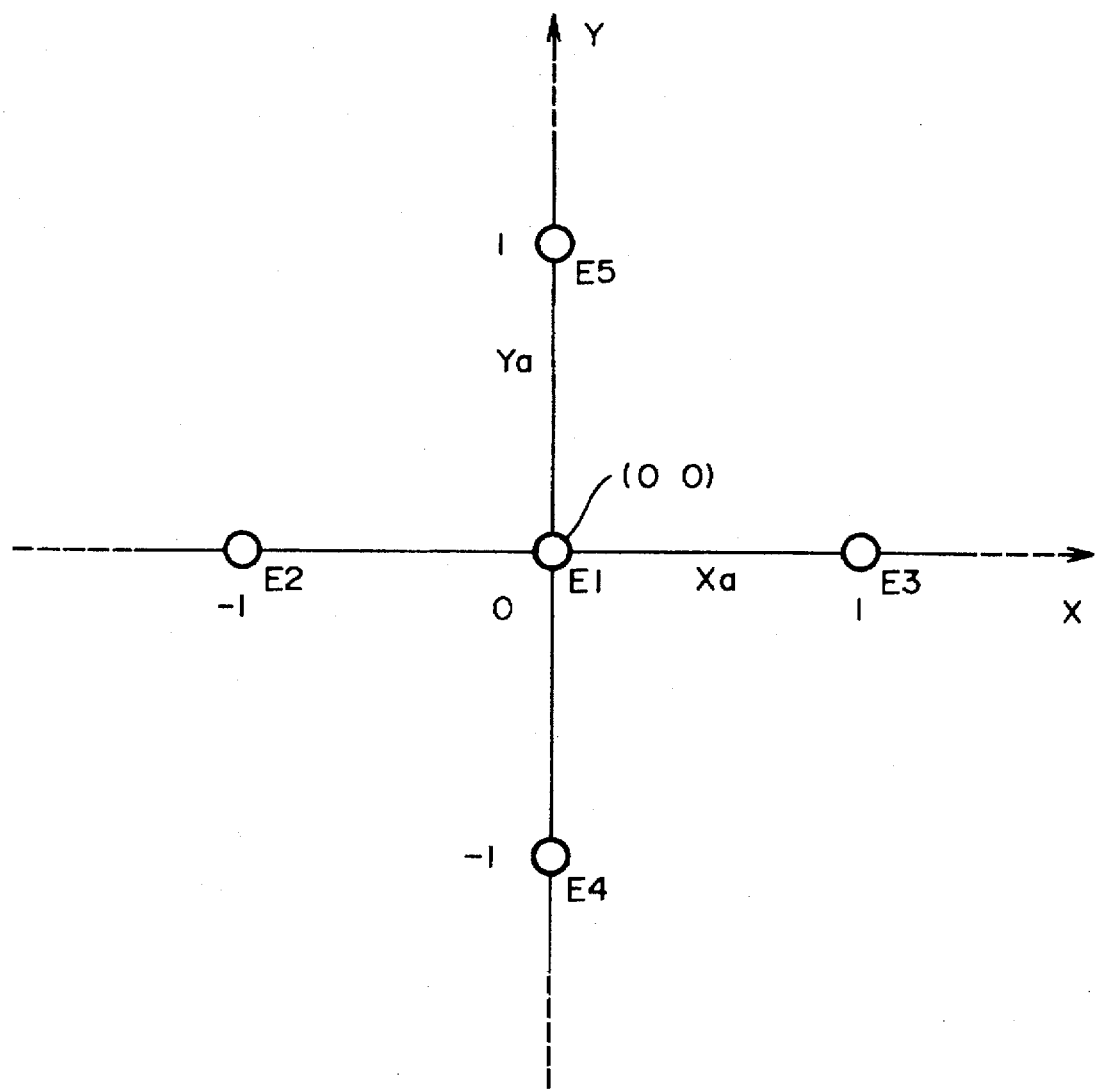
FIG. 14 is a view showing a situation in which the calculation of the difference total sum is viewed from the z-axis direction (the right above) with a position of D1 as the origin.

If those expressions are plotted along the x-axis and y-axis, respectively, the five points as shown in FIG. 13 or FIG. 14 will be required. In the figures, the curves which correspond to the expressions (7) and (8) are represented by Xa and Ya, respectively. Therefore, the number of difference total sums used in Step S13 is in total 5 with respect to both the x-direction and the y-direction. Thus, the values of En corresponding to the coordinates of the absolute value difference total sums E1 to E5 in FIGS. 13 and 14 are obtained in Step S12.

In Step S12, as shown in FIG. 13 or FIG. 14, with respect to the five areas D1 to D5 in the picture C, the absolute value difference total sums E1 to E5 for the areas Bi in the picture A are obtained by calculation. At this time, the coordinates of x and y are selected in such a way that the absolute value difference total sum E1 out of the absolute value difference total sums E1 to E5 takes the smallest value. In this connection, when this processing is executed in one difference total sum calculating unit, the five absolute value difference total sums E1 to E5 are calculated. In addition, when this processing is executed in the units which are independent of each other with respect to the x-direction and the y-direction, the three absolute value difference total sums E1, E2 and E3 are calculated in the first difference total sum calculating unit 115, while the three absolute value difference total sums E4, E1 and E5 are calculated in the second difference total sum calculating unit 116.

In Step S13, the coefficients are determined by solving the simultaneous equations shown in the expressions (7) and (8) on the basis of the results of the processings of Steps S11 and S12. Then, the coefficients a, b, c, d, e and f in the equations are determined. In addition, as can be seen from Step S14, both the coefficients c and f are not required for the processing of obtaining the motion vector. Therefore, in the present method, it is also possible to omit the processing of calculating those coefficients c and f, and hence the higher speed processing is made possible.

By differentiating the equations (7) and (8), respectively, the following expression relating to the coordinates (xo, yo) of the extreme value is obtained.

$$(xo, yo) = (-2a/b, -2d/e) \quad (9)$$

The relation of "the extreme value = the local minimum value" is ensured from the fact that each of the expressions (7) and (8) is a quadratic function, and the fact that in the values of the absolute value difference total sums En, the absolute value difference total sum E1 is always a minimum value.

In Step S14, the coordinates (xo, yo) giving a minimum value as shown in FIG. 12 are obtained by substituting respectively the coefficients which have been obtained in Step S13 into the expression (9). At this time, the motion vector Vi=(Vx, Vy) for the picture C of the macro block Bi to be obtained can be obtained from the following expression.

$$(Vx, Vy) = (xo - x\_org, yo - y_{org}) \quad (10)$$

As described above, the motion vector Vi can be obtained by executing the processings of Steps S11 to S14 in this order.

As described above, in the present embodiment, both the unknown coefficients a, b, c and d and the coordinates (xo, yo) of the area to which the area B has moved need to be calculated. However, the required number of calculations for the absolute value difference total sums is only 5, and also, the calculation of the x-coordinate can be processed in parallel with the calculation of the y-coordinate. Therefore, the calculation amount can be greatly reduced as compared with the conventional method.

In the present embodiment, since when obtaining the expressions (7) and (8), the macro block D1 is used as the macro block which is used to obtain the difference total sums required for obtaining the both expressions, the difference total sums are calculated with respect to the five macro blocks. However, it should be noted that the difference total sum for the macro block in the intersection between both the approximate curves is not necessarily employed.

In addition, if the movement is performed for a short period of time, the area to which the area of interest has moved is not so far from the initial position of the area of interest. However, in the case where the significant extreme values are not found in the expressions (9) and (10), the position of the macro block of the sample point for use in obtaining the approximate curve is shifted to obtain the approximate curve again. That is, in the case where the extreme value (the local minimum value) which is obtained with respect to the x-coordinate is larger than a predetermined value, the x-axis in the picture C is moved parallel thereto to select the macro block which will be the comparison area. In addition, in the case where the extreme value (the local minimum value) which is obtained with respect to the y-coordinate is larger than a predetermined value, the y-axis in the picture C is moved parallel thereto to select the macro block which will be the comparison area. In such a way, the approximate curve is obtained again.

As set forth hereinabove, according to the present embodiment, the x-direction of the distribution of the difference total sums between the objective area by which the motion vector is to be obtained and its comparison areas is obtained independently of the y-direction thereof, and also that distribution is applied to the simple quadratic curve to obtain its coefficients. In addition, the coefficients thus obtained are respectively substituted into the expressions of the coordinates where the expression expressing the curve which is previously obtained takes the extreme value, thereby obtaining the position where the difference total sums become minimum. According to the present embodiment, the number of difference total sums which must be calculated in order to obtain the motion vector of a certain area in the image is very small as compared with the conventional method wherein the difference total sums are obtained on every picture element or every other picture element. Therefore, the total calculation amount required for obtaining the motion vector of the image can be largely reduced, and hence the speed of the processing can be made higher.

What is claimed is:

1. An image motion vector detection method of detecting a motion vector representing movement of an objective area in a first image of a plurality of successive images, said method comprising:

an objective area determining step of determining the objective area in the first image;

a polynomial determining step of determining both a degree and the number of terms of a polynomial, said polynomial including a variable corresponding to predetermined coordinates within said first image, the polynomial approximately expressing a distribution of the sum of the differences between comparison areas determined in a second image and the objective area of said first image;

a comparison area determining step of determining both the number and positions in the second image of the comparison areas, which are sufficient for determining coefficients for the terms in the polynomial;

a total sum of the differences calculating step for obtaining a value of the n-th power of a total sum of the differences of the objective area and the comparison area with respect to the plurality of comparison areas by using a predetermined power n;

a coefficient calculating step for calculating the coefficients of the polynomial by using the values of the n-th power of the total sums; and a minimum value calculating step of obtaining coordinates, in which a minimum value is obtained in the polynomial having the calculated coefficients, as coordinates of an area in the second image representing movement of the objective area.

2. An image motion vector detection method according to claim 1, wherein the polynomial is a quadratic polynomial, the number of comparison areas is equal to or more than 5, and the power n is an integral number in the range of 1 to 8.

3. An image motion vector detection method according to claim 1, wherein the objective area is a macro block compressed according to a digital motion picture compression format.

4. An image motion vector detection apparatus for detecting a motion vector representing movement of an objective area in a first image of a plurality of successive images, said apparatus comprising:

objective area determining means for determining the objective area in the first image;

polynomial determining means for determining both a degree and the number of terms of a polynomial representing an approximate curved surface approximately expressing a distribution of the total sum of the differences between comparison areas, which are determined in a second image before or after the first image, and the objective area;

total sum of the differences calculating means for determining both the number and positions in the second image of comparison areas, which are sufficient for determining coefficients of the terms of the polynomial, and for obtaining a value of the n-th power of the total sum of the differences between the objective area and the comparison area using a predetermined power n, with respect to the plurality of comparison areas which have been determined in number and positions; and minimum value calculating means for calculating the coefficients of the polynomial using the obtained values of the n-th power of the total sum of the differences, and for obtaining coordinates, in which a minimum value is obtained in the polynomial having the calculated coefficients, as coordinates of an area in the second image before or after the movement of the objective area.

5. An image motion vector detection apparatus according to claim 4, wherein the polynomial is a quadratic polynomial, the number of comparison areas is equal to or more than 5, and the power n is an integral number in the range of 1 to 8.

6. An image vector detection apparatus for detecting a motion vector representing movement of an objective area in a first image of a plurality of successive images, each of the plurality of the successive images including a plurality of separate areas which are obtained by division along first and second reference axes intersecting each other, said apparatus comprising:

a first total sum of the differences calculating means for selecting arbitrary number of first separate areas, which are present on the first reference axis, of the plurality of separate areas in a second image before or after the first image, and for calculating a first total sum of the differences between each of the first separate areas and the objective separate area;

a first polynomial determining means for substituting respectively the first total sum of the differences into a predetermined first polynomial including a variable corresponding to the first reference axis and a plurality of unknown first coefficients, to obtain the first coefficients to specify the first polynomial;

a first extreme value calculating means for obtaining a first extreme value of the specified first polynomial, and for detecting a first motion vector representing the movement of the separate objective area along the first reference axis on the basis of the obtained first extreme value when said first extreme value is below a predetermined first value, and when said first extreme value is above said first predetermined value, substituting a third reference axis parallel to the first reference axis;

a second total sum of the differences calculating means for selecting an arbitrary number of second separate areas, which are present on the second axis, of the plurality of separate areas in the second image, and for calculating a second total sum of the differences between each of the second separate areas and the objective separate area, with respect to the arbitrary number of second separate areas;

a second polynomial detecting means for substituting respectively the second total sum of the differences into a predetermined second polynomial including a variable corresponding to the second reference axis and a plurality of unknown second coefficients, thereby obtaining the plurality of second coefficients to specify a second polynomial; and a second extreme value calculating means for obtaining a second extreme value of the specified second polynomial, and for detecting a second motion vector representing the movement of the separate objective area along the second reference axis on the basis of the second extreme value when said second extreme value is below a predetermined second value, and when said second extreme value is above said second predetermined value, substituting a third reference axis parallel to the second reference axis.

7. An image motion vector detection apparatus according to claim 6, wherein the first and second reference axes are coordinate axes intersecting each other.

8. An image motion vector detection apparatus according to claim 6, wherein the objective area is a macro block from motion picture compression according to a digital motion picture compression format.

* * * * *